United States Patent Office 3,672,787
Patented June 27, 1972

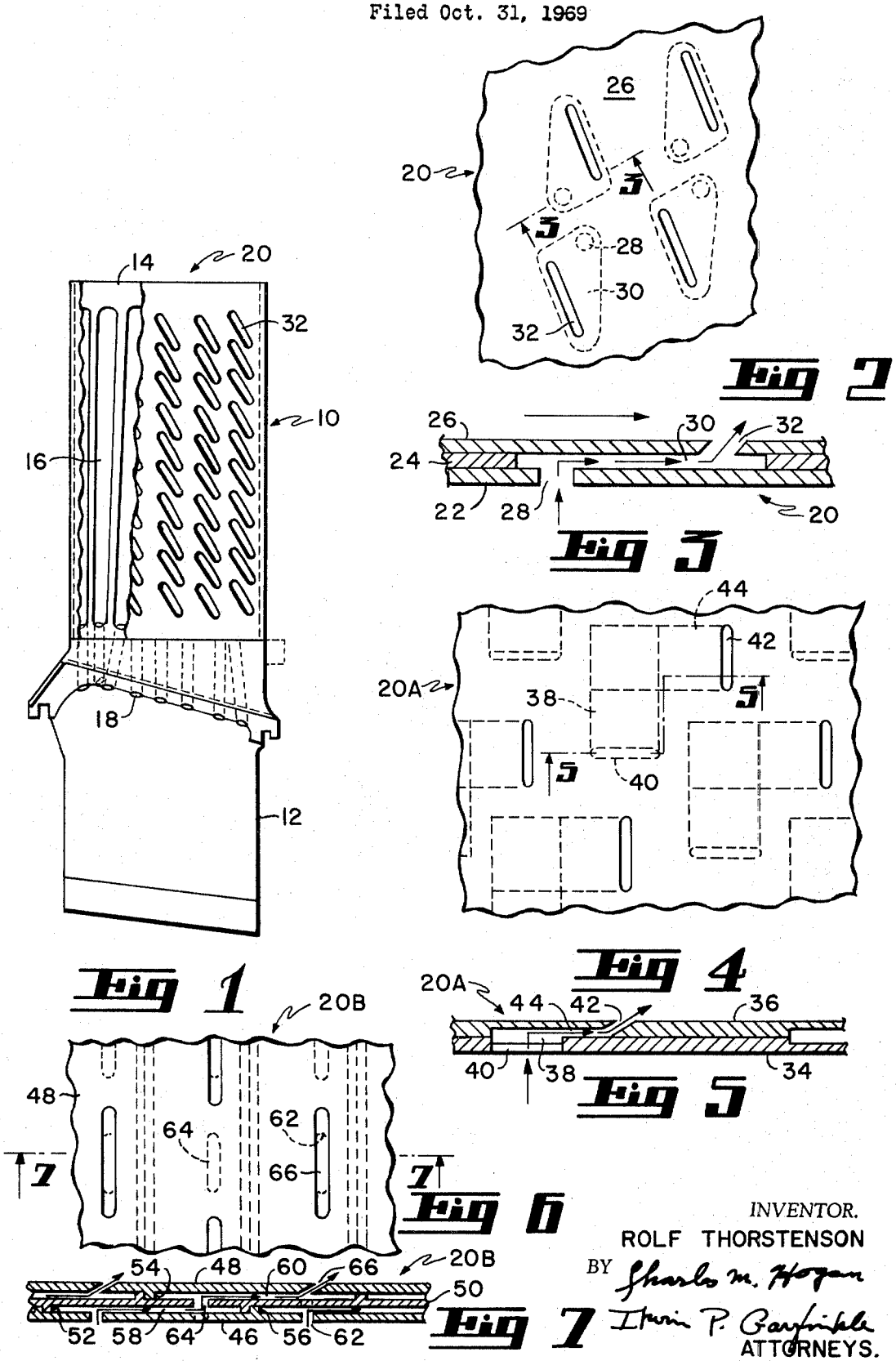

3,672,787
TURBINE BLADE HAVING A COOLED LAMINATED SKIN
Rolf A. Thorstenson, Westport, Conn., assignor to Avco Corporation, Stratford, Conn.
Filed Oct. 31, 1969, Ser. No. 872,947
Int. Cl. F01d 5/08
U.S. Cl. 416—97
11 Claims

ABSTRACT OF THE DISCLOSURE

A turbine blade is comprised of a core having open troughs enclosed by a laminated skin to form coolant passages. Each layer of the laminated skin has cooperating cavities which provide coolant flow passages through the skin. This results in the combination of convection cooling within the multi-layered laminated skin, and boundary layer cooling on the surface of the turbine blade.

BACKGROUND OF THE INVENTION

There is at the present time a demand for the reduction in size of gas turbine engines while at the same time increasing output power. As a result, turbine operating temperatures greatly exceed the temperatures which the modern super alloy materials can withstand. Because of this it has been necessary to cool the components of the modern high performance engines, one of the most critical components being the first stage turbine rotor blade. Transpiration cooling has been found to be one of the most effective cooling methods.

Transpiration cooling results from the effusion of a fluid through a porous structure into the boundary layer on the hot gas side in order to maintain the structure at a temperature considerably below that of the hot gas stream. The cooling is accomplished by: (1) Absorption of heat by the coolant within the porous walls and (2) alteration of velocity and temperature boundary layer profiles, resulting in reduced wall shear stress and heat transfer. The part which each of these two mechanisms plays in effecting cooling depends upon the porous structure being used, the coolant rate, and the hot gas stream flow conditions.

There are many structures known in the prior art for effecting transpiration cooling. Among these are porous materials such as a wire mesh. However, it is very difficult to produce these structures with uniformity so that consistent results can be achieved under a mass production condition. The present invention takes advantage of many aspects of the prior art functions but utilizes a transpiration skin made up of multiple sheets, each having cavities which in combination provide coolant passages within and through the skin.

SUMMARY OF THE INVENTION

Three embodiments of the invention are shown. The first embodiment is a skin made of three sheets, each sheet being apertured to provide for the entry of coolant through one, parallel flow through the middle, and exit into the hot gas stream through the last. In the second embodiment the same results are achieved using only two sheets, each of the sheets being provided with cooperating cavities terminating at their opposite ends in entry and exit ports, respectively. In a third embodiment three layers of sheets are used providing for multiple flow cascaded paths within the skin. Broadly speaking, the invention contemplates the use of two or more layers with cavities to provide passages for the flow of coolant between the layers.

The drawings:
FIG. 1 is a side elevation of a turbine blade, shown partly broken away and incorporating a multilayered cooling skin on a supporting core;
FIG. 2 is an enlarged area of a portion of FIG. 1 showing a first embodiment of the invention;
FIG. 3 is a section taken through the line 3—3 in FIG. 2;
FIG. 4 represents a second embodiment of this invention in which the skin is comprised of only two layers;
FIG. 5 is a cross section taken through the line 5—5 in FIG. 4;
FIG. 6 is a third embodiment of this invention using three plates for producing cascaded coolant passages; and
FIG. 7 is a cross section taken through the line 7—7 in FIG. 6.

DESCRIPTION OF THE FIRST EMBODIMENT

FIG. 1 shows a turbine blade generally indicated at 10 and having a root 12 for mounting on a turbine wheel (not shown). The turbine blade 10 is fabricated of a supporting core 14 provided with a plurality of open troughs 16. Orifices 18 provide a passage through which coolant air is delivered to each trough 16. The supporting core 14 is covered and the troughs 16 are enclosed by a composite skin 20.

As shown in FIG. 3, the composite skin 20 comprises three layers, an inner layer 22, a middle layer 24 and an outer layer 26. The object of utilizing three layers in the composite skin 20 is to produce a skin in which there is an internal coolant flow. For that purpose the inner layer 22 is provided with a plurality of entry holes 28. The middle layer 24 is provided with a plurality of open areas 30 and the outer layer 26 is provided with a plurality of angled exit slots 32. The entry holes 28, open areas 30, and angled exit slots 32 are positioned in registration to provide a coolant passageway through the skin 20. As shown, the holes, areas and slots are arranged in columns and rows, each column registering with a respective trough 16.

With the arrangement of the entry holes, open areas and slots, as shown in FIG. 2, coolant air passing through the orifices 18 and into a respective trough 16, travels through the holes 28, traverses the open areas 30 and exits from the skin through the exit slots 32. Thus, a wide area of the composite skin is provided with an internal flow of coolant air. The movement of the coolant air through the skin provides convection cooling within the skin and film cooling upon exiting from the slots 32.

DESCRIPTION OF THE SECOND EMBODIMENT

In the second embodiment of this invention as seen in FIGS. 4 and 5, the composite skin 20A comprises only two layers, an inner layer 34 and an outer layer 36. The inner layer 34 is provided with cavities 38 arranged in columns and rows, each cavity having an inlet slot 40, each column of slots 40 being aligned with a respective trough 16. Similarly, the outer layer 36 is provided with exit slots 42 and cavities 44 which register with respective cavities 38 to provide an internal coolant passageway within the skin. Thus, coolant air passes from the troughs 16 through slots 40, the passage formed by cavities 38 and 44 and out through angled exit slot 42.

As seen in FIG. 4, the cavities 38 and 44 are overlapped rectangles, oriented at right angles to one another. This provides a tortuous and turbulent path for the coolant air and may be advantageous for cooling purposes.

THE THIRD EMBODIMENT

The third embodiment, as seen in FIGS. 6 and 7, uses three layers to provide cascade internal passages. Thus, in FIGS. 6 and 7 the skin 20B is provided with three layers, an inner layer 46, an outer layer 48 and a middle layer 50. The layers are spaced by means of ribs 52 extending from both sides of the middle layer and by means of ribs 54 and 56 on the inner and outer ribs, respectively, thus providing a plurality of cavities 58 and 60 between the three layers.

The inner layer 46 is provided with inlet slots 62 which register with the troughs 16, while the inner layer is provided with slots 64 to provide communications between the cavities 58 and 60. The outer layer has angled outlet slots 66.

In each of the embodiments, the several layers may be diffusion bonded, brazed or otherwise bonded in any suitable manner to form the composite skin 20, and then welded or bonded to the core 14.

Also, in each of the embodiments the outer layer exit slot provides for distribution of the coolant gases along the outside surface so as to provide an effective thermal boundary layer profile. The various constructions provide the combination of (1) convection cooling within the blade, and (2) film cooling as a result of the alteration of the boundary layer profile.

SUMMARY

This invention provides an efficient structure for turbine blades consisting of a multilayer cooling path configuration which is formed and attached to an internal supporting structure. Cooling air is distributed to each region of the cooled skin by means of a cooling passage network having selected orifice holes as an integral part of the inner support structure. The skin design provides a combination of convection cooling within the multilayers and boundary layer cooling along the outside surface exposed to the hot gases. A large convective area within the layers along with numerous coolant flow interruptions and directional changes provide an efficient heat rejection ability close to the source of heat. Film cooling is produced by means of injecting the coolant into the hot gas stream through a series of holes of a particular shape, size, and orientation so as to lay down an effective insulating layer along the outer surface. An inherent feature of the multilayer design is the thermal conduction insulating quality created by the large void area within the composite, thus establishing a high thermal resistance path between the hot gases and the inner supporting structure resulting in a lower inner core operating temperature, thereby improving the core stress rupture life. While the embodiments shown use an exit slot having an acute angle, a perpendicular slot may be used under appropriate circumstances.

I claim:

1. A cooled composite turbine blade adapted for use in a hot gas stream, said blade comprising:
a supporting core having a plurality of open troughs;
a laminated skin on said core, said laminated skin enclosing said troughs to provide coolant passages, said laminated skin comprising an inner layer and an outer layer, a plurality of enclosed cavities formed between said layers, at least one inlet port through said inner layer at each of said enclosed cavities for providing coolant flow from said passages to said cavities, and a radially extending row of elongated exit slots in said outer layer at each of said enclosed cavities for providing coolant flow from said cavities to the exterior of said laminated skin, said exit slots in each row being uniformly oriented in an angled overlapping arrangement relative to the flow of the gas stream across said blade to provide a uniform cooling film over substantially all of the exterior surface of said blade.

2. The invention as defined in claim 1 wherein said exit ports are disposed at an acute angle with respect to said outer layer, whereby said coolant is discharged over said outer layer.

3. The invention as defined in claim 1 wherein said wall structure includes an inner layer, said inner layer having a plurality of open areas therethrough, said open areas providing said cavities.

4. The invention as defined in claim 1 wherein said layers are spaced by ribs, said ribs forming said cavities.

5. The invention as defined in claim 1 and an intermediate layer between said inner and outer layers, said cavities being formed between said inner and intermediate layers and between said intermediate and outer layers; and a plurality of ports in said inner layer providing coolant passage between said cavities.

6. The invention as defined in claim 5 wherein said layers are spaced by ribs, said ribs forming said cavities.

7. The invention as defined in claim 1 wherein said cavities are formed to provide a tortuous coolant path.

8. The invention as defined in claim 7 wherein said tortuous path includes a right angle turn.

9. The invention as defined in claim 1 wherein said cavities are formed by overlapping recesses in said layers.

10. The invention as defined in claim 9 wherein said recesses extend at an angle to one another to provide a tortuous coolant path.

11. The invention as defined in claim 1 wherein said inlet port to a respective cavity is located at one end thereof and wherein said exit port for said cavity is located at the opposite end thereof, whereby said coolant traverses substantially the entire length of said cavities before exiting.

References Cited

UNITED STATES PATENTS

| | | | |
|---|---|---|---|
| 3,584,972 | 6/1971 | Bratovich et al. | 416—229 |
| 3,240,468 | 3/1966 | Watts et al. | 416—231 X |
| 3,349,558 | 10/1967 | Smith | 416—97 X |
| 3,554,663 | 1/1971 | Helms | 416—90 |
| 3,560,107 | 2/1971 | Helms | 416—90 |
| 2,529,946 | 11/1950 | Imbert | 416—23 X |
| 2,613,058 | 10/1952 | Atkinson | 416—95 UX |
| 2,618,462 | 11/1952 | Kane | 416—96 UX |
| 2,787,049 | 4/1957 | Stalker | 416—97 UX |
| 3,067,982 | 12/1962 | Wheeler | 416—90 |
| 3,411,794 | 11/1968 | Allen | 416—95 UX |
| 3,527,543 | 9/1970 | Howald | 416—231 X |
| 3,527,544 | 9/1970 | Allen | 416—90 |

FOREIGN PATENTS

| | | | |
|---|---|---|---|
| 774,499 | 5/1957 | Great Britain | 416—97 |

EVERETTE A. POWELL, JR., Primary Examiner

U.S. Cl. X.R.

416—231